Patented Apr. 8, 1952

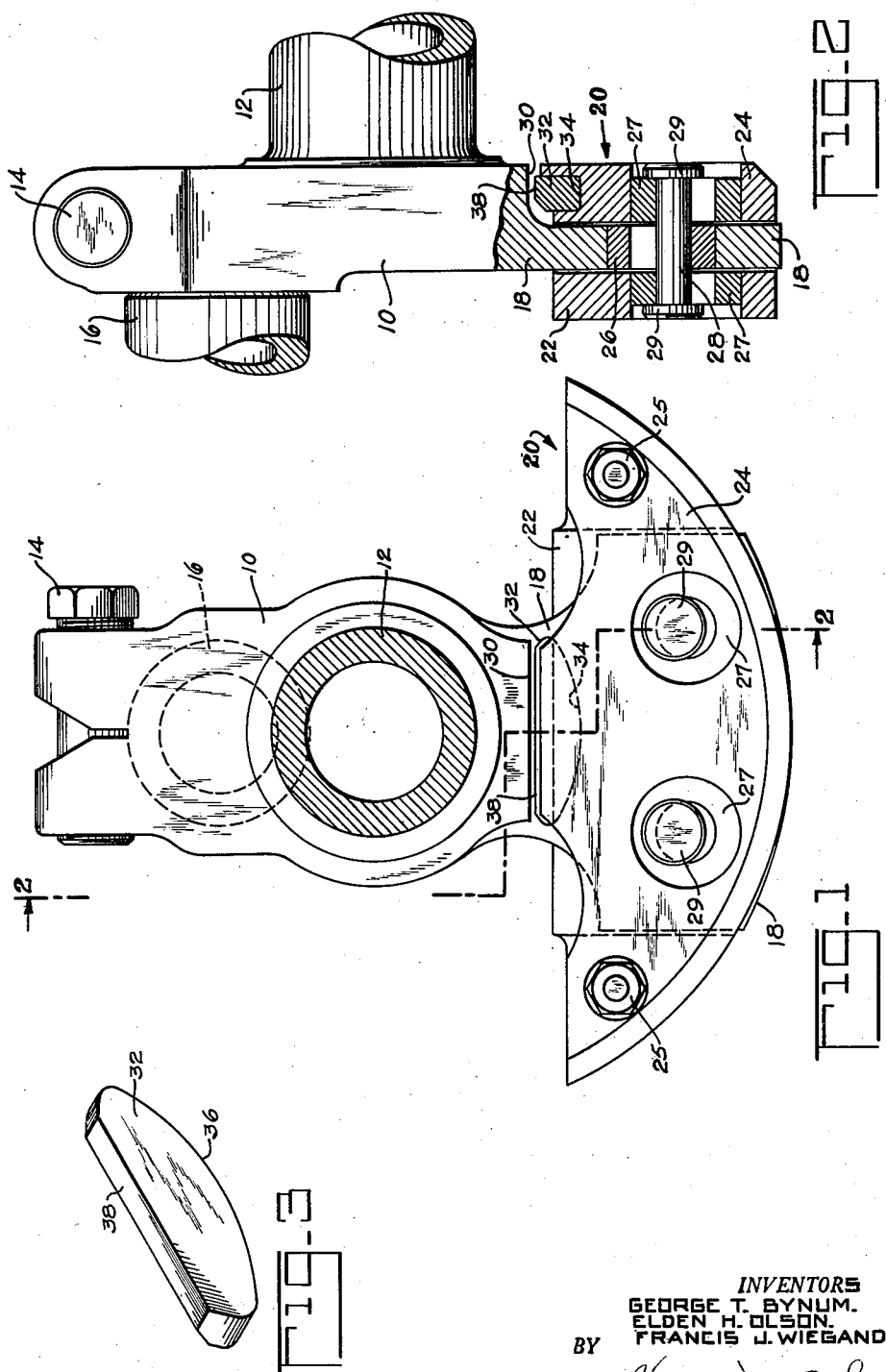

2,592,114

UNITED STATES PATENT OFFICE 2,592,114

AMPLITUDE LIMITING MEANS FOR
VIBRATION DAMPERS

George T. Bynum, Fair Lawn, Elden H. Olson, Paterson, and Francis J. Wiegand, Ridgewood, N. J., assignors to Curtiss-Wright Corporation, a corporation of Delaware Application September 8, 1948, Serial No. 48,284

2 Claims. (Cl. 74—604)

This invention relates to centrifugal pendulums for damping torsional vibrations of rotating shafts—for example as disclosed in Patent No. 2,112,984 to R. Chilton—and is particularly directed to improved means for limiting the amplitude of vibration of such dampers.

The type of damping means disclosed in said patent comprises a weight or a counterweight pivotally supported from a lateral extension of a shaft by a pair of spaced rollers disposed in holes formed in both said weight and shaft extension. The holes in said weight and shaft extension have a diameter larger than that of said rollers and the arrangement is such that said holes provide cylindrical tracks for the rollers for pivotally supporting said weight against the centrifugal force acting thereon during rotation of the shaft. Such dampers are quite commonly used for damping torsional vibrations of aircraft engine crankshafts. During normal engine operation, the amplitude of vibration of such a damper is quite small. However, in the absence of some means to limit the amplitude of the vibration of the damper, said amplitude may become quite large during engine starting or when the engine backfires, with the result that said rollers might drop out and/or the damper weight might cause pounding on said rollers and their tracks. In order to limit the amplitude of vibration of such dampers, it has been general practice to provide a flat abutment surface on the crankshaft for engagement by a flat surface on the damper weight—for example as disclosed in Patent No. 2,137,418 to C. Shay. Because of manufacturing tolerance it is quite difficult to make said amplitude-limiting flat abutting surfaces engage parallel to each other even if the damper rollers remain in engagement with their tracks. In addition, during engine starting and stopping, the counterweight will flop about quite haphazardly so that, regardless of the precision with which the damper is made, during said engine starting and stopping said amplitude limiting surfaces will generally engage at an angle to each other. If said flat surfaces do not engage parallel to each other then their area of engagement will be quite small with the result that the contact pressure thereon becomes excessive and causes scuffing and mutilation of said surfaces.

It is an object of the present invention to provide a novel arrangement comprising flat abutting surfaces for limiting the amplitude of vibration dampers such that said flat surfaces automatically engage parallel to each other so as to distribute their contact pressure over a large area.

Other objects of the invention will become apparent upon reading the annexed detailed description in connection with the drawing; in which:

Figure 1 is an end view of a torsional damper embodying the present invention;

Figure 2 is a view partly in section taken along line 2—2 of Figure 1; and

Figure 3 is a perspective view of the abutment member carried by the counterweight of the damper illustrated in Figures 1 and 2.

Referring to the drawing, a crank-cheek 10, having a crankshaft journal 12, is clamped by a bolt 14 to the crankpin 16 in accordance with the conventional crankshaft construction of a radial cylindrical aircraft engine. The crank-cheek 10 is provided with an extension 18 on the opposite side of the crankshaft axis from the crankpin 16. A counterweight 20, comprising a pair of plates 22 and 24 clamped together by bolts 25 is disposed about the crankshaft extension 18. The crankshaft extension 18 is provided with a pair of spaced parallel bores having hardened rings 26 secured therein with their axes parallel to the crankshaft axis. Each counterweight plate 22 and 24 is provided with a similar pair of parallel bores having hardened rings 27 secured therein with their axes disposed parallel to the crankshaft axis. The rings 26 and 27 all have the same internal diameter and the rings 27 in the counterweight plate 22 are co-axial with the rings 27 in the counterweight plate 24. A cylindrical roller 28 extends through each ring 26 into a pair of co-axial rings 27, each said roller having an outer diameter smaller than the internal diameter of said rings. With this construction, the rings 26 and 27 provide cylindrical tracks for the rollers 28 thereby providing a pendular bi-filler support for the counterweight 20 from the crankshaft extension 18. The torsional vibration damper construction so far described is conventional. The invention, however, is not limited to this specific damper construction—for example the damper rollers and/or their tracks may be modified as illustrated in copending application Serial No. 591,782 of R. Chilton, now Patent No. 2,484,073, granted October 11, 1949.

The cylindrical rollers 28 have annular end flanges 29 of a diameter only slightly smaller than the internal diameter of the rings 26 and 27 in order to permit assembling of said rollers within said rings. During crankshaft rotation, the counterweight member 20 is urged radially outward away from the crankshaft axis by the centrifugal force acting thereon whereby the annular end flanges 29 prevent the rollers 28 from falling or working their way out of the rings 26 and 27. During normal engine operation, the amplitude of vibration of the counterweight 20 is quite small so that during said normal operation the annular flanges 29 are effective to keep their rollers 28 in position within the rings 26 and 27. If, however, the counterweight 20 is permitted to have a large amplitude of vibration, as might occur during engine starting or when the engine backfires, the counterweight 20 might assume a position in which the rollers 28 could fall or work their way out of the rings 26 and 27. In addition, if the counterweight 20 is permitted to have large amplitudes of vibration, said counterweight may cause excessive pounding on the supporting rollers 28 and their tracks in the rings 26 and 27. To avoid either of these occurrences, the amplitude of vibration of the counterweight 20 is limited by engagement of said counterweight with a flat surface 30 on the crankshaft extension 18. As illustrated the surface 30 is parallel to the plane defined by the axes of the rollers 28.

In the prior art damper constructions, a flat surface rigid with the counterweight is arranged to engage a flat crankshaft surface, such as the surface 30, to limit the amplitude of vibration of the counterweight. For manufacturing reasons exact parallelism of said surfaces is difficult to obtain. If said surfaces are not parallel, they will engage at some angle to each other even though the damper rollers remain in engagement with their tracks, whereby the area of engagement of said surfaces necessarily is small. Furthermore, regardless of the parallelism of said surfaces, during engine starting and stopping the motion of the damper counterweight is quite haphazard so that during said starting and stopping and surfaces will generally pound or strike each other at some angle. When said surfaces pound each other at an angle, the contact pressure on said surfaces may become sufficiently high to cause scuffing and mutilation of said surfaces.

In accordance with the present invention, the effect of this pounding on the crankshaft extension surface 30 is reduced by keeping the area of counterweight engagement with said surface as large as possible. For this purpose, the counterweight 20 is provided with a stop or abutment member 32 comprising a cylindrical segment fitted in a groove 34 in the counterweight side plate 24. The groove 34 has a concave cylindrical bottom wall with its axis disposed parallel to the crankshaft axis and said groove has parallel flat side walls disposed perpendicular to said axes. The abutment member 32 has a cylindrical surface portion 36 and flat side walls fitted within the groove 34. In addition, said abutment member has a portion projecting from the groove 34 with a flat surface 38 adapted to engage the flat surface 30 on the crankshaft extension 18 to limit the amplitude of vibration of the counterweight 20. When the damper weight 20 is in the mid position of its path of pendular swinging movement the surfaces 30 and 38 are spaced apart as illustrated. When the amplitude of the swinging movement of the weight 20 exceeds a certain value the flat surfaces 30 and 38 will engage at the ends of said swinging movement to prevent any further increase in said amplitude. During normal engine operation however the surfaces 30 and 38 obviously do not engage. With this construction, regardless of the position of the counterweight 20 relative to the crankshaft axis, when the surfaces 30 and 38 engage, the abutment member 32 automatically rotates in its cylindrical groove to a position in which said surfaces engage parallel to each other. In this way high localized contact pressures on said surfaces are avoided.

As illustrated, the flat surface 30 is integral with the crank-cheek extension 18. If desired, however, said surface may be formed on a member secured to said extension—for example as disclosed in the aforementioned patent to Shay.

While we have described our invention in detail in its present preferred embodiment, it will be obvious to those skilled in the art, after understanding our invention, that various changes and modifications may be made therein without departing from the spirit or scope thereof. We aim in the appended claims to cover all such modifications.

We claim as our invention:

1. In combination: a shaft member; a weight member, each of said members having two parallel laterally spaced arcuate tracks facing corresponding arcuate tracks in the other of said members; roller means disposed between each facing pair of said tracks to provide a pendular bi-filar support of said weight member from said shaft member; means on one of said members having a flat surface disposed substantially parallel to the plane defined by the axes of said roller means, the other of said members having a groove with a concave cylindrical bottom wall with the axis of said cylindrical wall disposed parallel to the axes of said roller means; and an abutment member constituting a cylindrical segment swingably fitted within said groove and having a flat surface spaced from said first-mentioned flat surface, during normal operation, in all positions of said weight member along its path of pendular swinging movement, said abutment member flat surface being engageable with said first-mentioned surface to limit the amplitude of said swinging movement.

2. In combination: a shaft member; a weight member, each of said members having two parallel laterally spaced arcuate tracks facing corresponding arcuate tracks in the other of said members; roller means disposed between each facing pair of said tracks to provide a pendular bi-filar support of said weight member from said shaft member; means on said shaft member having a flat surface disposed substantially parallel to the plane defined by the axes of said roller means, said weight member having a groove with a concave cylindrical bottom wall with the axis of said cylindrical wall disposed parallel to the axes of said roller means; and an abutment member constituting a cylindrical segment swingably fitted within said groove and having a flat surface spaced from said first-mentioned flat surface, during normal operation, in all positions of said weight member along its path of pendular swinging movement, said abutment member flat surface being engageable with said first-mentioned surface to limit the amplitude of said swinging movement.

GEORGE T. BYNUM.
ELDEN H. OLSON.
FRANCIS J. WIEGAND.

REFERENCES CITED

The following references are of record in the file of this patent:

UNITED STATES PATENTS

| Number | Name | Date |
| --- | --- | --- |
| 2,112,984 | Chilton | Apr. 5, 1938 |
| 2,209,480 | Spencer | July 30, 1940 |
| 2,225,098 | Chilton | Dec. 17, 1940 |
| 2,239,078 | Chilton et al. | Apr. 22, 1941 |
| 2,448,989 | Leake | Sept. 7, 1948 |